United States Patent [19]

Strayham

[11] Patent Number: 4,693,011

[45] Date of Patent: Sep. 15, 1987

[54] APPARATUS FOR ESTABLISHING ANGLES OF OBJECTS

[76] Inventor: Stephen G. Strayham, Box 542F, Biloxi, Miss. 39532

[21] Appl. No.: 888,684

[22] Filed: Jul. 24, 1986

[51] Int. Cl.[4] .................................................. B43L 7/06
[52] U.S. Cl. ........................................ 33/451; 33/382
[58] Field of Search .................................. 33/451, 382

[56] References Cited

U.S. PATENT DOCUMENTS 3,524,259  8/1970  Handley ................................ 33/382
4,451,993  6/1984  Yauk .................................. 33/451 X

FOREIGN PATENT DOCUMENTS 1240 of 1878 United Kingdom .................. 33/451

Primary Examiner—William D. Martin, Jr.
Attorney, Agent, or Firm—Alexander F. Norcross

[57] ABSTRACT

An apparatus for measuring an angle has a first planar bar member upon the edges of which are inscribed reciprocal angular scales corresponding to the tangent of an angle established by the position of the apparatus. A sliding measurement bar is maintained in substantially perpendicular relationship by an interlocking tongue and groove joint, and has an indicator for reading the set angle against the two planar scales. The tongue and groove joint and the two scales permit the apparatus to be constructed as a flat based planar device for both measuring an angle and transferring the measured angle from a physical object to a blue print or drawing of the object measured. Perpendicular spirit levels are placed in the sliding bar to allow the angle measuring device to be used with respect to horizontal or vertical positions for measuring the angle of actual physical construction such as beams or pipes.

3 Claims, 7 Drawing Figures

APPARATUS FOR ESTABLISHING ANGLES OF OBJECTS

BACKGROUND OF THE INVENTION

This invention relates to apparatus for the measurement and establishment of angles, especially in the construction trade for the measurement of angles of physical objects, already constructed.

Within the construction trades, especially in the two (2) fields of carpentry and pipe fitting, it is often necessary either to establish the angle of inclination of a physical object, or to construct a series of physical objects having an identical angle. The former occurs when it is necessary to obtain a revised drawings of an existing construction, or, often, when it is necessary to modify an existing construction for which there are incomplete drawings or inadequate specifications.

The latter situation is commonly found in such constructions as the rafters under a roof. As is well known, all rafters should be at a designed angle, the pitch angle of the roof. It is more critically important, however, that each of the rafters be at an identical angle so as to maintain a smooth constant roof pitch.

The prior art devices for such angle measurement are based upon varying forms of protractor. While there are numerous variants in the construction of the dial and pointer, each of the prior art devices depends upon the existence of a circle or an arc, inscribed with machine scribed angle measurements at fixed degree increments, and equipped with some form of pointer mechanism to indicate the angle of inclination of the measuring device.

Each of these devices, therefore, poses a significant accuracy and repeatability problem due to the geometry of its construction. Those devices that are based on a complete circle, which is the form of most free space angle measurement devices consisting of an inscribed circle and pointer to determine the overall tilt of the circle, naturally require for placement upon a physical object that there be sufficient free space around the object to permit insertion of the circle. Since this free space is often limited, there are significant constraints on the permitted diameter of a circle for such a measuring device in order that it may be fit to the object to be measured. The diameter being arbitrarily small, the circumference is naturally limited, as is well known, and the physical distance between incremental marks can be quite small. It is typically found that such a device can only be read to an accuracy of plus or minus 1 degree, and thus repeated measurements may vary by this amount. When extended over a nominal distance or when multiple measurements are required on one object the error becomes noticeable and undesirable.

Alternate forms of angle measuring devices utilize an arc, inscribed as a protractor, and a lever arm pivoted along the arc to indicate an angle. Again, the geometry of such an object requires that the size of the arc be smaller that the distance between the points to be measured, as the measurement arm must extend beyond the arc to be aligned with the item to be measured. The same problems thus arise in regards to the calibration of, readability of, and repeatability of measurements along such an arc due to the close spacing of the degree marks on a realizable instrument. The innate errors in such a measuring device when propagated along a physical construction of appreciable size are unacceptable.

SUMMARY OF THE INVENTION

The current invention provides an innovative device with revised geometry for indicating, measuring and repeating an angle in free space, with respect to gravitational horizontal or vertical, of a measured object. By revising the geometry of the measurement process, the inventive apparatus provides for a much expanded visual scale for angle measurement, compared to a protractor having equivalent physical size restraints.

The apparatus is, in its simplest form, a T-bar, having a sliding cross bar, and a perpendicular shaft with spirit levels to permit the perpendicular shaft to be placed at either a vertical or a horizontal position with great accuracy. The geometry of the T-bar is such that it is calibrated by the tangent of the angle formed between the end of the T-bar and the base of the perpendicular shaft. It is found that such a calibration produces extremely precise repeatability, and in a typical tool of reasonable size for single handed use is capable of being repeatably set to angles having fractional degree measurements.

It is thus the purpose of this invention to provide a physical measurement tool for measuring an angle in free space having an expanded, more readable scale in comparison to that of a protractor having equivalent physical size constraints.

It is a further object of this invention to provide a measurement device which can accurately establish and set up a repeated series of angles in the construction trade, having a precision of less than 1 degree variance.

It is a further object of this invention to provide an angle measuring instrument that, having once been set to a desired angle, can be readily and easily used to determine whether a series of physical objects are inclined at the preset angle.

This and other objects of the invention will be more clearly seen from the detailed description of the preferred embodiment which follows.

DETAILED DESCRIPTION OF THE PREFERRED EMBODIMENT

Figure 1:
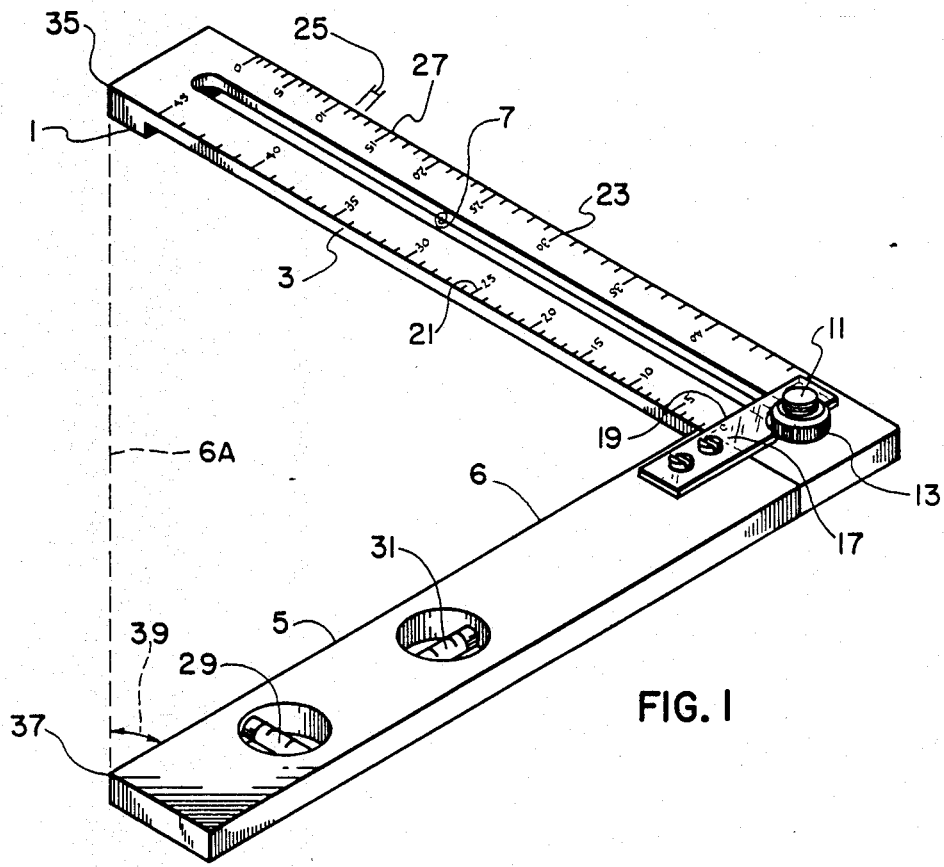
FIG. 1 shows the construction of an embodiment of the invention in face view.

FIG. 1 shows a preferred embodiment of the invention, which has the general shape of a movable t-square or angle measurer 1 comprising in major components a moveable bar member 3 substantially perpendicularly mounted, and adapted for moving laterally with respect to a vertical bar member 5. It is desireable that the moveable bar member 3, which must be free to slide laterally with respect to the vertical bar member 5, must be joined to the vertical bar member 5 by means which preserve the perpendicular relationship of bar 3 to bar 5, which can be freed to permit ready resetting of the relative position of moveable bar 3 with respect to vertical bar 5, and yet will also permit, after positioning of moveable bar 3 with respect to vertical bar 5, the fixing of the position so as to permit the angle measurer 1 to be used to measure an angle as will be more clearly described below.

Figure 1A:
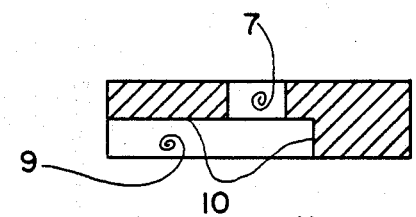
FIG. 1A and FIG. 2B show cross-section profiles.
Figure 1B:
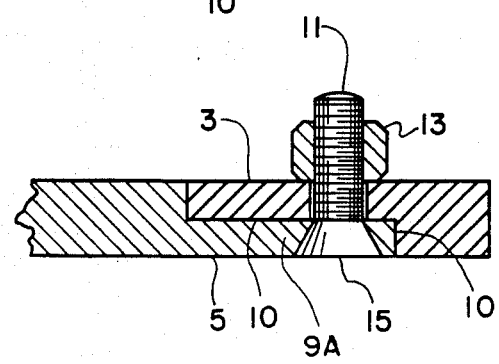

In the preferred embodiment known to the inventor, the adjoining of moveable bar 3 and vertical bar 5 is by means of a step lap or rabbet joint as more clearly shown in cross-section in FIG. 1A and FIG. 1B.

FIG. 1A, a cross-section through moveable bar 3, shows an extending lateral slot 7, extending substantially the length of moveable bar 3 and adapted to receive a screw fastening means 11 as will be described below.

An underside of moveable bar 3 is provided with a rabbet groove 9 adapted to receive a facing member 9A of vertical bar 5. Rabbet groove 9 and mating rabbet member 9A mutually define a pair of engaging faces 10, which as known in the field of rabbet joints, are substantially perpendicular to one another, and which establish and define the relative perpendicular positioning of moveable bar 3 to vertical bar 5 when rabbet 9 and 9A are adjoined at faces 10.

There is additionally provided a clamping means 11, in this particular embodiment a screw member, extending through vertical bar 5 and through the provided slot 7 in moveable bar 3. Screw 11 is further provided with a securing nut 13 which may be any type suitable for manual tightening including a wing nut. In the preferred embodiment screw 11 is provided with a counter-sunk head 15, which, as is known in the art, provides, by means of its conicle shape and mating conicle counter-sunk recess within vertical bar 5, a self-centering function which centers and aligns screw 11 in a position mutually perpendicular to both moveable bar 3 and vertical bar 5. Thus, the tightening of securing nut 13 will clamp moveable bar 3 with respect to vertical bar 5 in a fixed position determined essentially by the rabbet joint 9, 9A and the screw 11.

Vertical bar 5 is further provided with a cursor means 17 which provides a means for establishing an index line 19 for accurately permitting visual determination of the relative position of vertical bar 5; there is correspondingly provided a numeric scale 21 upon an edge of moveable bar 3 which in cooperation with the index permits the ready positioning of vertical bar 3 with respect to vertical bar 5 in a repeatable manner with respect to the index marks 19. An identical, reciprocal scale is provided upon an opposite edge of moveable bar 3; scale 23 is identical in form, shape and calculation to scale 21 save that its origination and termination points are exactly reversed for the origination and termination points of scale 21.

As reciprocal scale 23 is the converse of scale 21, the particular marking of scale 21, herein described, should be understood to apply also to reciprocal scale 23. Scale 21 is composed of a plurality of degree marks 27 spaced between each other by an inter-mark gap 25 and numbered periodically to correspond to a subtended angle defined by the position of moveable bar 3 and vertical bar 5. The scale is calculated to represent for each mark the angle 39 formed between the lengthwise edge 6 of vertical bar 5 and a line of position 6A defined by adjacent corner 37 of vertical bar 5 and 35 of moveable bar 3. The sale 21 will be seen thus to be a scale defined by the tangent of angle 39 and the individual inter-marked gaps 25 between two marks 27, the two marks representing a first and a second angle 39, are calculated by the difference between the tangent of the first such angle 39 times the length of edge 6 and the tangent of the second angle 39 times the length of the edge 6. It should be noted that inasmuch as the angle 39 for each setting of the moveable bar 3 is defined with respect to a line of position 6A between adjacent corners 35 and 37 that inter-mark gaps 25 on reciprocal scale 23 will be equal to, although reversed from, the inter-mark gaps on scale 21; this is because the adjacent corners 35, 37 do not change. It is for this reason that there is no scale expansion between scale 21 and reciprocal scale 23 even though reciprocal scale 23 is located upon an opposite edge of moveable bar 3, and it is for this reason, therefore, that reciprocal scale 23 is described as being in exact reciprocal of scale 21.

Imbedded within vertical bar 5 are found a first spirit level 29 and a second spirit level 31. First spirit level 29 and second spirit level 31 are positioned exactly perpendicular to one another, and in the preferred embodiment are positioned so that one spirit will accurately indicate when vertical bar 5 is being held in an exactly vertical position, in a manner known to the art of spirit levels, and second spirit level 31 will accurately indicate when vertical bar 5 is being held in an exactly horizontal position. First spirit level 29 and second spirit level 31 thus allow the angle measurer 1 to be exactly positioned with respect to vertical or to horizontal with respect to any arbitrary construction.

Figure 2A:
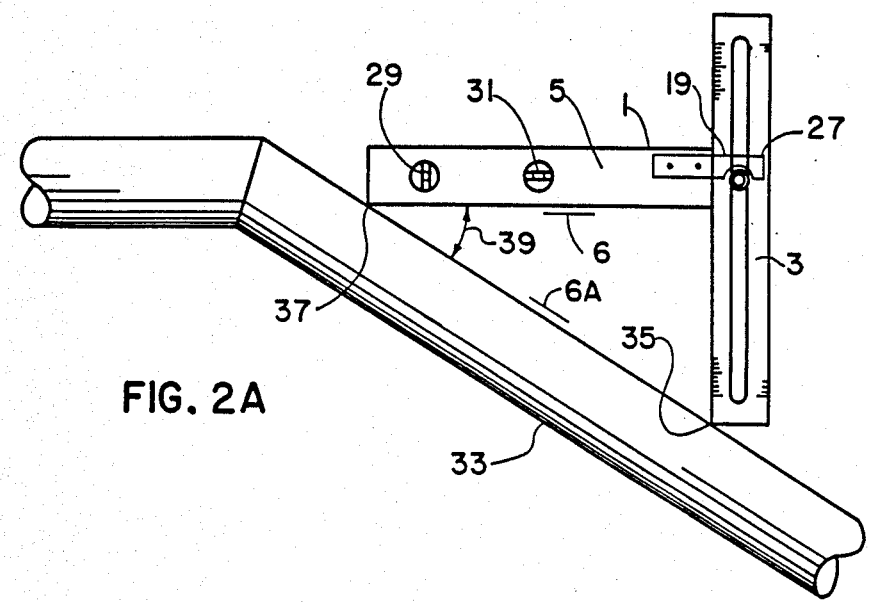
FIG. 2A shows the use of the invention to measure the angle of a physical object having an inclination of less than 45 degrees to the horizontal, and, in FIG. 2B, to measure the angle of a physical object having an inclination of greater than 45 degrees to the horizontal.
Figure 2B:
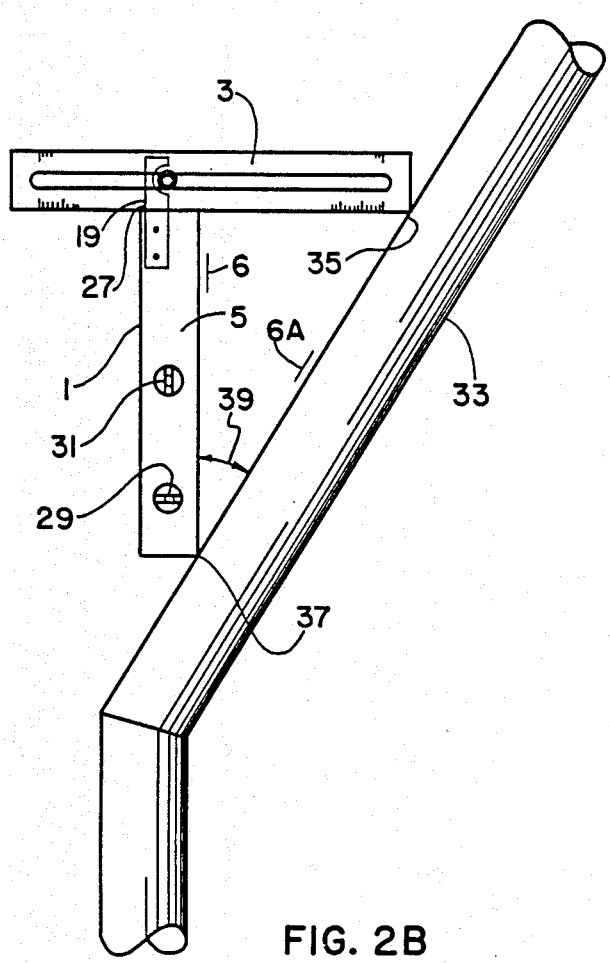

In use, as depicted in FIGS. 2A and 2B, an article to be measured 33 is found, already constructed and positioned with respect to the environment. Screw 11 is loosened so as to permit relative movement of moveable bar 3 with respect to vertical bar 5. Depending upon whether article 33 is relatively more horizontal (FIG. 2A) or relatively more vertical (FIG. 2B), which is usually established by simple observation, vertical bar 5 is positioned in an exactly horizontal or an exactly vertical position by means of leveling second spirit level 31 or first spirit level 29. Adjacent corner 37 is brought into contact in relationship with the surface of article 33 to be measured and moveable bar 3 is then laterally transposed until second adjacent corner 35 is brought into contacting relationship with the article 33 to be measured; this is done while maintaining the exact vertical or exact horizontal positioning of bar 5 by means of first spirit level 29 or second spirit level 31 as appropriate. When adjacent corners 37 and 35 are both in contacting relationship with the article to be measured, nut 13 is tightened so as to bring moveable bar 3 into a fixed relationship with vertical bar 5. The exact angle of inclination of object 33 is then readily determined by reading the appropriate mark 27 which has been brought under index 19; it will be found that the size of inter-mask gap 25 is sufficiently large that the angle can be accurately read to small fractions of a degree by interpolation; this is distinct from the typical weighted protractor of the prior art which is difficult to read even to an accuracy of one degree.

It can readily be seen that inasmuch as the angular relationship determined above is now fixed into the angular measurement device 1 subsequent to be constructed items may be set to the same inclination as measured item 33 by simply bringing the angle measurer 1 into contact with such subsequent items in the same manner as described for measuring an angle, and adjusting the item until the spirit level indicates, as with the original measurement for article 33, that measurer 1 has been brought to a vertical or a horizontal position as appropriate. Thus, as a specific example, a series of rafters may be readily and easily brought to an identical angle matching a first, master rafter. In a similar manner a plurality of supports may be brought to exact alignment with one another, in each case to well within a fraction of a degree of accurate alignment.

Figure 3:
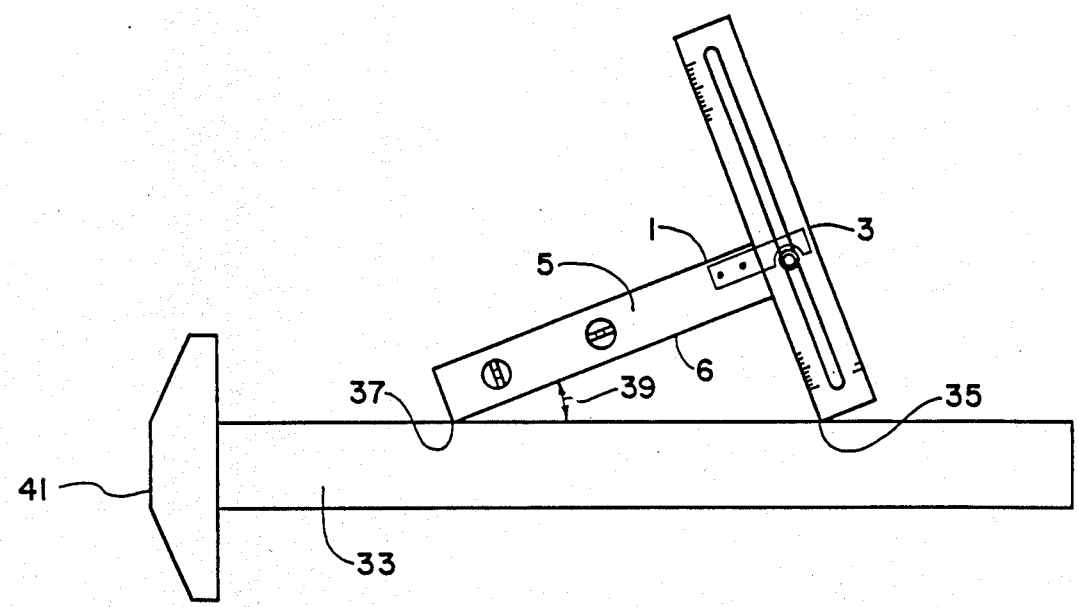
FIG. 3 shows the use of the apparatus in lieu of a protractor to set up an arbitrary angle for drafting.

Alternative uses are clearly possible for the measuring device 1. For example, as shown in FIG. 3, in the field of drafting an angle may be set by positioning the moveable bar 3 with respect to vertical bar 5, utilizing the index to exactly position the appropriate mark; the angle measurer is then secured by tightening nut 13. Adjacent corners 35, 37 may then be positioned against a known horizontal such as a straight edge 33 providing a ready scribing line 6 to scribe the preset angle 39.

Figure 4:
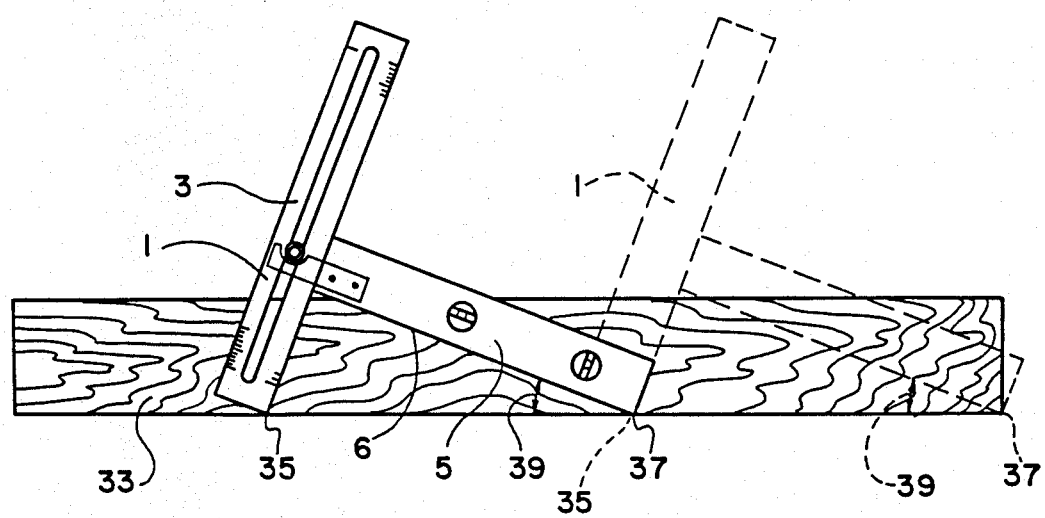
FIG. 4 shows the use of the apparatus to set up a repeated angle in the carpentry trade.

In a similar manner a series of identical angles may be scribed off, as shown in FIG. 4, on a work to be described such as a plank 33. Again, angle 39 is preset upon measuring device 1 by the appropriate positioning of bar 3 with respect to bar 5, again utilizing index 19 against the desired angular mark 27. Again, adjacent corners 35, 37 are positioned against a desired edge of the article to be measured 33 and the desired angle 39 may be readily marked off by scribing along edge 6.

It can thus be seen from the above illustrations that the angle measuring device 1 described herein serves as a general angle indicator, but its particular value remains the ability of the innovative combination shown to be able to preset or to measure an angle on a piece of construction with respect to horizontal or vertical, and the ability of the angle measuring device 1 within a reasonable physical size to achieve angle measuring accuracies that are visually more repeatable and precise than those of prior art protractors encompassed within the same maximal external dimensions. Thus the invention is not confined to the exact preferred embodiment described above but to all equivalent devices. In particular, the construction of the joint, above described as a rabbet joint 9, may be any particular joint known to the art which permits both slidable positioning of moveable bar 3 with respect to vertical bar 5 while preserving a substantially perpendicular relationship between vertical bar 5 and moveable bar 3. The particular joint described in the preferred embodiment was chosen for its ease of reproduction with acceptable accuracy utilizing simple manufacturing techniques.

I claim:

1. An apparatus for mensuration of an angle comprising:
   A. a first bar member;
   B. a second bar member, slidably affixed substantially perpendicular and co-planar to said first bar member;
   C. a first, tangential, graduated scale upon the first bar member;
   D. a second, tangential, graduated scale, reciprocally positioned with respect to the first scale, upon the first bar member; and
   E. index means for indicating the position of said second bar member with respect to said first scale and said second scale.

2. The apparatus as described in claim 1 above wherein said apparatus further comprises:
   A. means for indicating that said first bar member has been positioned in a first horizontal, or in a second vertical position.

3. The apparatus as described in claim 2 above wherein said means further comprises:
   A. a first level indicating means affixed substantially perpendicular to said first bar member; and
   B. a second level indicating means affixed substantially perpendicular to said first level indicating means, and co-planar to said first bar member.

* * * * *